United States Patent [19]
Henderson et al.

[11] Patent Number: 6,016,116
[45] Date of Patent: Jan. 18, 2000

[54] NAVIGATION APPARATUS

[75] Inventors: David Sydney Henderson, Wickford; William Douglas McGinn, Basildon; Stewart David Miles, Billericay, all of United Kingdom

[73] Assignee: GEC Avionics Limited, United Kingdom

[21] Appl. No.: 07/105,112

[22] Filed: Sep. 30, 1987

[51] Int. Cl.[7] ................................................ G01S 13/00
[52] U.S. Cl. ................................................ 342/64
[58] Field of Search ............................ 364/449, 456; 342/64

[56] References Cited

U.S. PATENT DOCUMENTS

| 3,748,644 | 7/1973 | Tisdale et al. | 342/64 |
|---|---|---|---|
| 4,164,728 | 8/1979 | Marsh | 342/64 |
| 4,175,285 | 11/1979 | Dansac et al. | 342/64 |
| 4,179,693 | 12/1979 | Evans et al. | 342/64 |
| 4,602,336 | 7/1986 | Brown | 364/456 |

*Primary Examiner*—Theodore M. Blum
*Attorney, Agent, or Firm*—Venable; Robert J. Frank; Norman N. Kunitz

[57] ABSTRACT

Navigation apparatus in accordance with the invention uses a Large Reference/Small Scene approach in which a plurality of small scene areas are obtained by viewing the surroundings of a moving object and are compared together with a large reference area to produce a match between them, and hence give an indication of the position of the object with respect to the reference area. The apparatus utilises the fact that the small scene areas are in a known distribution and correlation maxima should be found having that distribution, other maxima being effectively randomly distributed.

16 Claims, 5 Drawing Sheets

NAVIGATION APPARATUS

BACKGROUND OF THE INVENTION

This invention relates to navigation apparatus in which the position and/or route of a moving body such as an aircraft (whether it be a manned or unmanned air vehicle) is determined by comparing an external viewed scene with previously prepared references. Such a process is usually termed "scene matching".

Navigation is concerned with determining a route from a given starting point to a desired destination. One navigation system now widely used for aircraft navigation is the Inertial Navigation System (INS). This estimates the position of an aircraft by monitoring and integrating its velocity and attitude changes. Another proposed system, known as the Global Positioning System (GPS), uses radio transmissions from a network of satellites. By knowing the predetermined positions of the satellites, the position of the vehicle may be estimated.

Although GPS navigation can be very accurate, its operation relies on active radio signals, which may cause problems in certain applications. INS is passive, but cannot achieve the accuracy of GPS. Also, cost increases rapidly with increasing accuracy. As a result of these factors, various new techniques for very accurate navigation have been investigated. Scene matching is one of the most promising techniques that can be combined with an INS (or other suitable system,) to give very high accuracy autonomous navigation which is also economical.

Scene matching may be implemented in two basic configurations; either the scene can be smaller than the reference, or it can be larger than the reference. In each case, imagery of the ground beneath the aircraft (the "scene(s)") is compared with a pre-stored "reference" in order to estimate the position of the former relative to the latter. If the co-ordinates of the reference are known then the co-ordinates of the aircraft can be estimated.

This comparison, or matching, takes the form of a cross-correlation between the scene(s) and the reference. One scene at a time may be correlated and generally there is some processing of the scene before it is correlated. The cross-correlation generates a surface called the correlation surface, where the numerical value at any point on the surface is an indication of the degree of match that exists between the scene and reference for that particular positioning of the one relative to the other.

The Small Reference/Large Scene system operates well with a low density of terrain features, and benefits from being able to concentrate on a unique feature for each match. On a particular planned route, a scene is captured each time the navigation system indicates that a predetermined waypoint is being overflown. The position fix thus obtained is then fed back into the navigation computer. The main disadvantage of this method is the relatively limited tolerance of across-track drift. The importance of this depends upon the application.

One method of dealing with larger errors (both across-track and along-track) is to use the Large Reference/Small Scene System. Previously, this has involved the matching of one scene (either square or rectangular in shape) against the stored reference. The major problem with this, however, is the possibility of a false correlation, i.e. the position of maximum cross-correlation may not correspond to the geographical location of the captured scene. This results in the estimated position of the aircraft being incorrect.

SUMMARY OF THE INVENTION

According to this invention there is provided navigation apparatus for a moving body comprising means for comparing a plurality of small area scenes, obtained by viewing the surroundings of the body as it moves with a large reference area, and means for finding the overall position of best match between the plurality of the small area scenes taken together and the large reference area.

By considering the plurality of small area scenes as a whole, it does not matter if one or two of them fail to give the expected correlation, or if some of them are not capable of providing a particularly high degree of correlation on their own. To a certain extent the navigation system relies on there being a sufficiently high probability of correlation between a given pattern of locations in the large reference area and a similar distribution of small area scenes even though the confidence level of a correct match for some or even all of the locations individually is fairly low.

When the position of the moving body has been determined in this way, further navigation can proceed, if desired, on the basis of a conventional scene matching process in which subsequently viewed small area scenes are correlated, or matched, to predetermined distinctive features, each of which is confined to an even smaller reference location. This latter process utilises less computational capacity, but is effective only if the position of the moving body can be fairly well predicted. The invention enables this requirement to be relaxed very considerably.

One way in which the invention may be performed is described below by way of example, with reference to the accompanying drawings.

DETAILED DESCRIPTION OF THE PREFERRED EMBODIMENT

Figure 1:
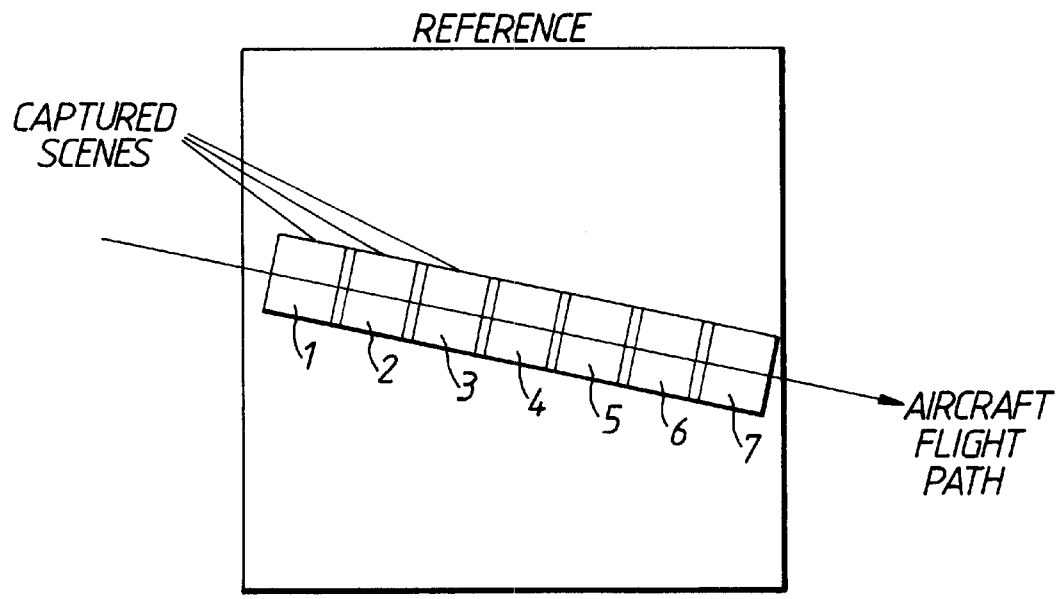
FIG. 1 indicates an aircraft flight path in relation to a large reference area.

FIG. 1 gives an example of the capturing of a sequence of scenes by an imaging system on board an aircraft as it flies over a reference area. This example shows the capturing of seven scenes 1 to 7, there being some overlap between successive scenes. By overlapping scenes by up to 50%, matching of features falling at the edges of scenes is improved, and features may be detected twice. For this large reference system to work, a sufficient number of the captured scenes must contain features that are represented in the reference. These scenes, when processed and correlated against the reference, will then provide sufficient information to enable the aircraft's flight path, and hence position, to be determined.

Figure 2:
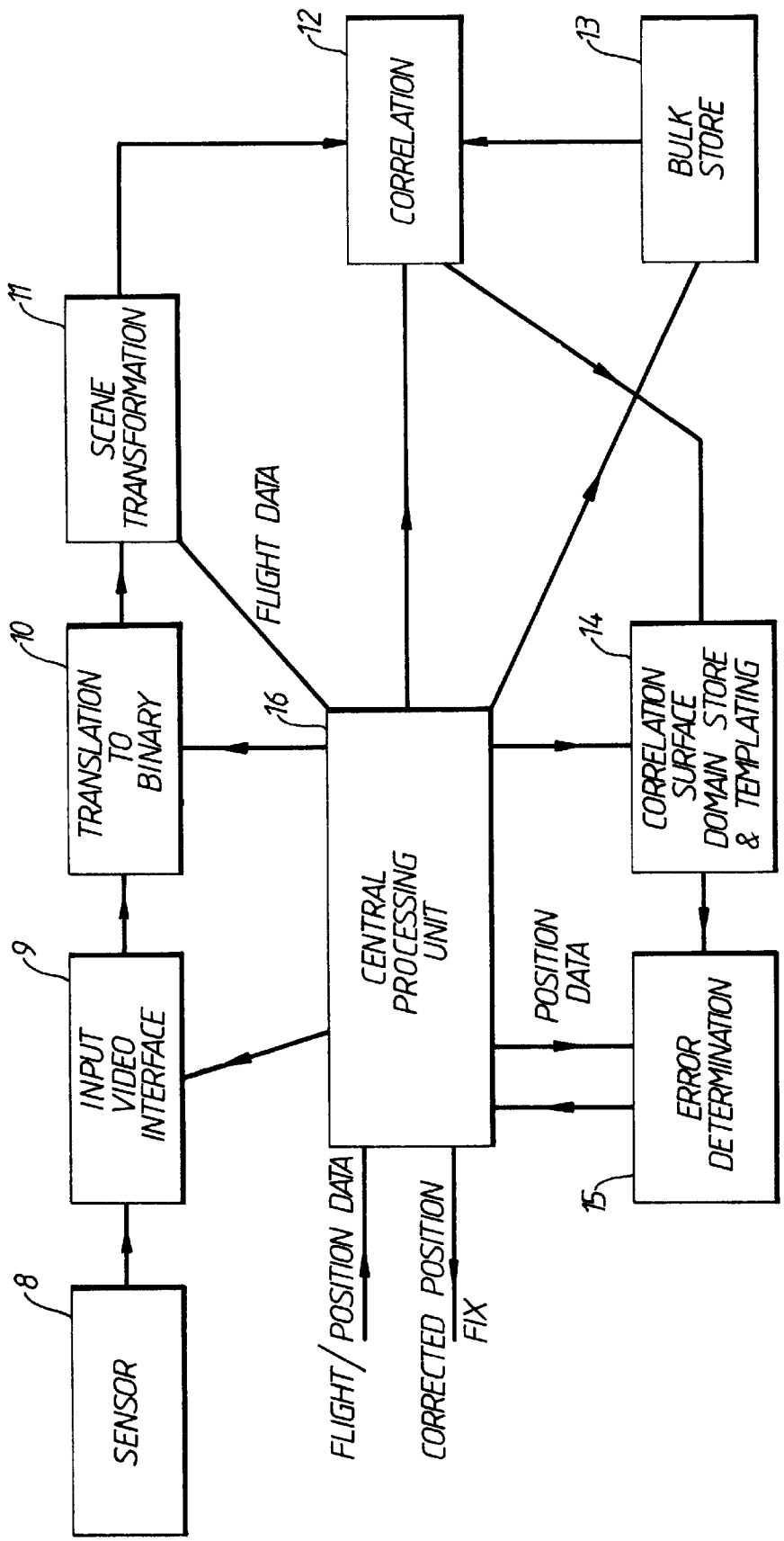
FIG. 2 is a schematic block diagram of apparatus in accordance with the invention.

With reference to FIG. 2, a sensor 8 produces a scene representative of the ground overflown by the aircraft. Each captured scene is digitised at input video interface 9 and processed to ensure that any relevant features contained in the scene are scaled by an amount depending on the height of the aircraft. The output of the interface 9 is applied to a circuit 10 which translates it into binary form, although it may be advantageous to use a grey scale in some applications. The scene information is then passed to a scene transformation circuit 11 which corrects for heading and drift of the aircraft. This enables satisfactory cross-correlation of the reference and scene to be achieved.

The scenes, after being processed at 11, are then correlated in turn at 12 against the reference which is stored in digital form at a bulk store 13.

Each correlation surface consists of a two-dimensional array of discrete values. The correlation surface value, or score, at a particular location is a measure of the likeness of the scene and reference for that particular position of the scene within the reference. Generally a "positive" correlation surface is produced by the correlation process (where peaks correspond to a strong cross-correlation), but alternatively the surface may have a "negative" polarity (where troughs correspond to a strong cross-correlation). The rest of this document is written in terms of a "positive" correlation surface.

Figure 3:
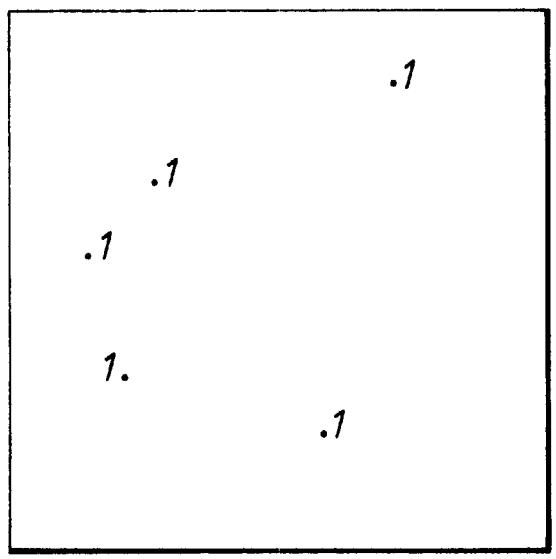
FIGS. 3 to 9 are explanatory diagrams.
Figure 4:
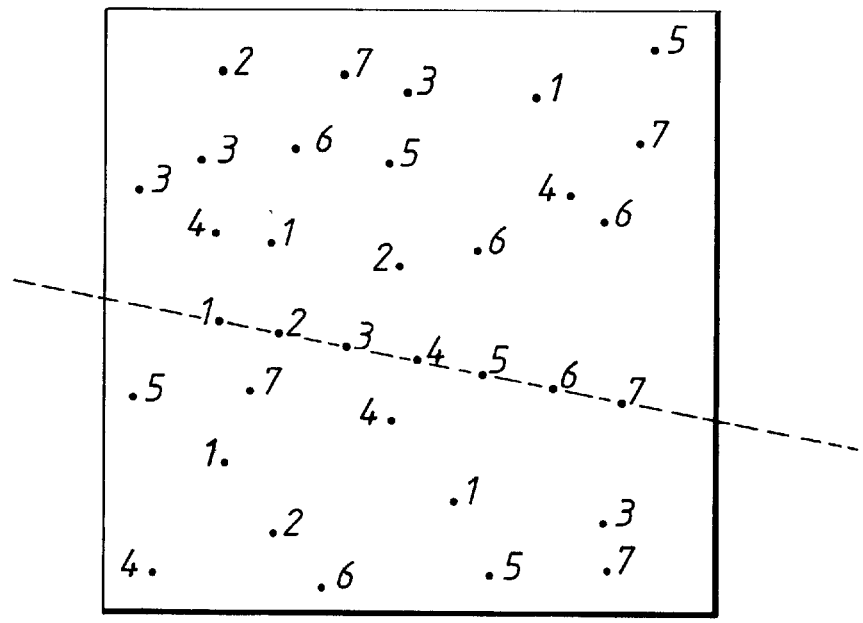

This technique of determining the aircraft flight path does not rely on the highest correlation score corresponding to the true ground position of the captured scene within the reference area. In order for the correlation to be of use, the processed scene used in the correlation merely needs to generate a significant peak corresponding to the true scene location. The term "peak" refers to any local correlation score maximum. Thus, scene 1 is compared at 12 over the whole of the reference area and, where significant similarities occur, a correlation peak is produced. This results in a number of peaks distributed over the correlation surface, indicated by numerals "1" on FIG. 3. In this example, the five peaks indicating the strongest cross-correlations are selected as being the most significant. However, some other criterion could be incorporated for determining which peaks are significant. This could be all peaks above some pre-set or adaptive threshold, Further selection could be applied, based on the proximity of adjacent peaks. The correlation process is then repeated for the remaining scenes. The peaks from all the correlation surfaces are then collected together in the "correlation surface domain", a two-dimensional space containing all the peaks positioned with respect to the correlation surface area, as illustrated in FIG. 4. The correlation surface domain is stored in a store 14, shown in FIG. 2.

The aircraft flight path is now extracted from the distribution of peaks by a method that may be termed "correlation peak template matching". This technique operates by recognising that all the peaks except those that correspond to the actual flight path of the aircraft are effectively randomly distributed.

Figure 5:
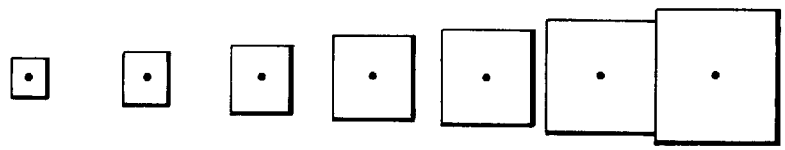
Figure 6:
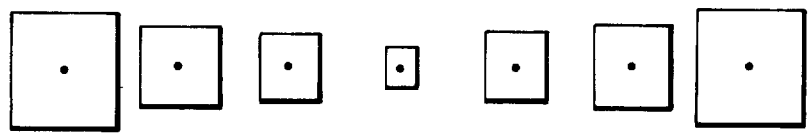

The peak template is constructed from a knowledge of the relative displacement of the captured scenes. This knowledge comes from the flight data generated by the Intertial Navigation system (or other suitable system) on board the aircraft. FIG. 5 shows the peak template that might be constructed for the scenes of FIG. 1. The central dots in the boxes refer to the exact positions of the captured scenes relative to one another as determined by the main navigation system. The boxes themselves, which may be any shape, indicate the "peak capture areas". Each of these corresponds to a region in which a peak is expected to be generated by the correlation of the appropriate scene with the reference. In the example shown in FIG. 5 the boxes are chosen to be of successively larger size, so that the box associated with the first scene 1 is smallest and that for the final scene 7 is largest. In another version, the box corresponding to the correlation peaks of central scene 4 is made smallest and the remainder increase in size as shown in FIG. 6. Alternatively, the boxes may all be the same size.

The peak template is compared with the correlation surface domain in order to find the position for which the greatest number of boxes are occupied by a peak from a relevant correlation surface, effectively performing a line or curve fitting technique. This may be achieved by using a least squares method. There will be no more than one peak from each correlation surface contributing to the "peak match score" at any position of the template. The peak match score is the term given to the number of peaks falling within the appropriate peak capture areas (e.g. only peaks from the correlation surface produced by scene 2 can render the peak capture area 2 occupied).

At the position of maximum peak match score, the peaks contributing to this score are all considered to have been generated by the various correlated scenes being in positions corresponding to the aircraft's actual location.

Figure 7:
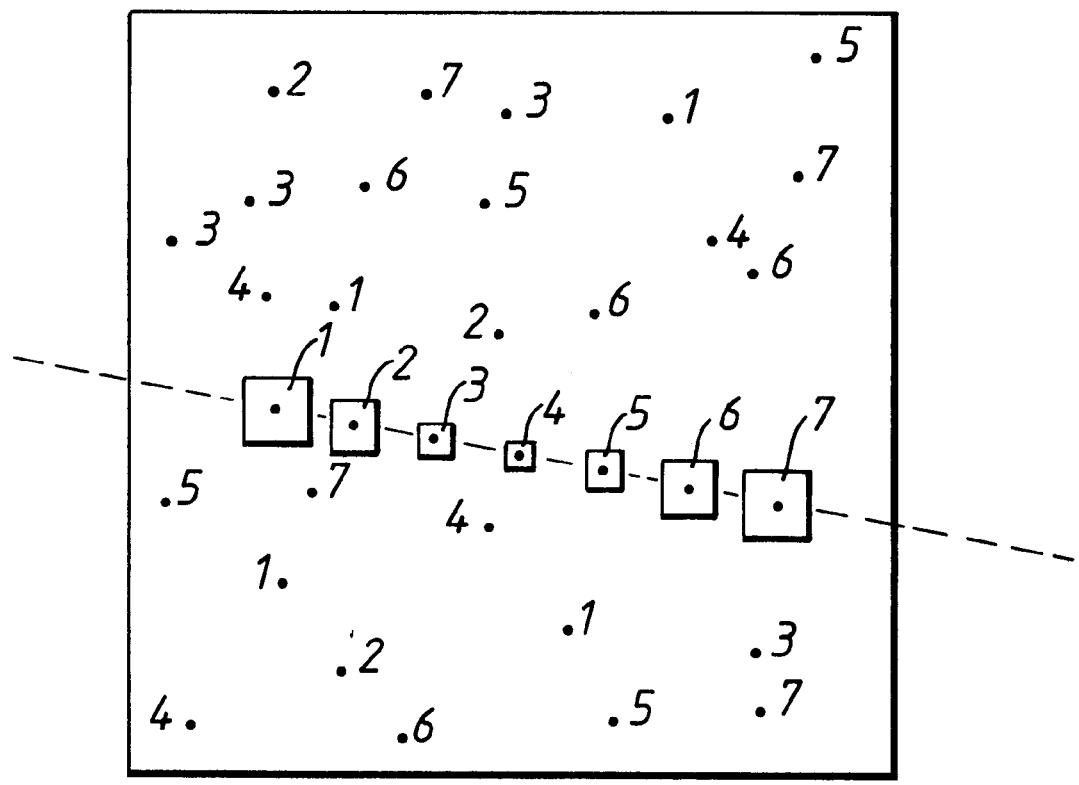
Figure 8:
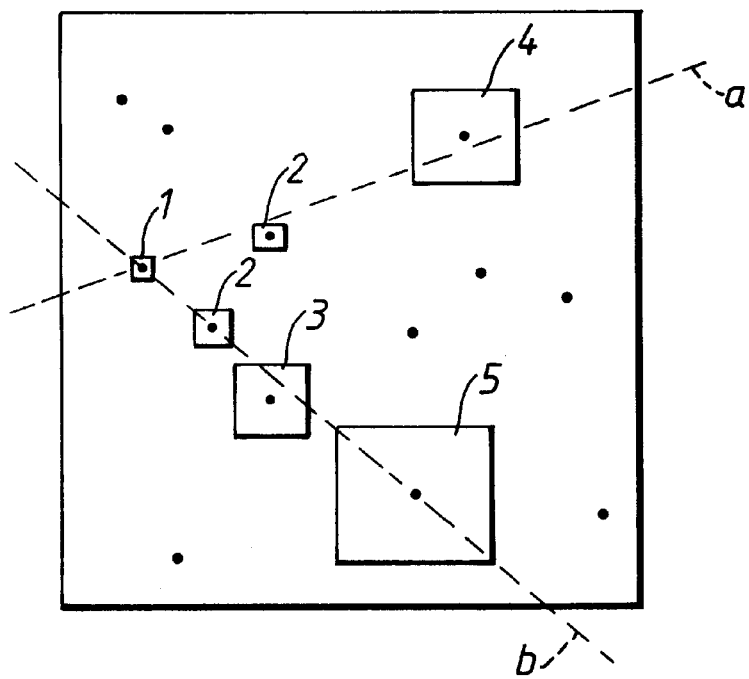
Figure 9:
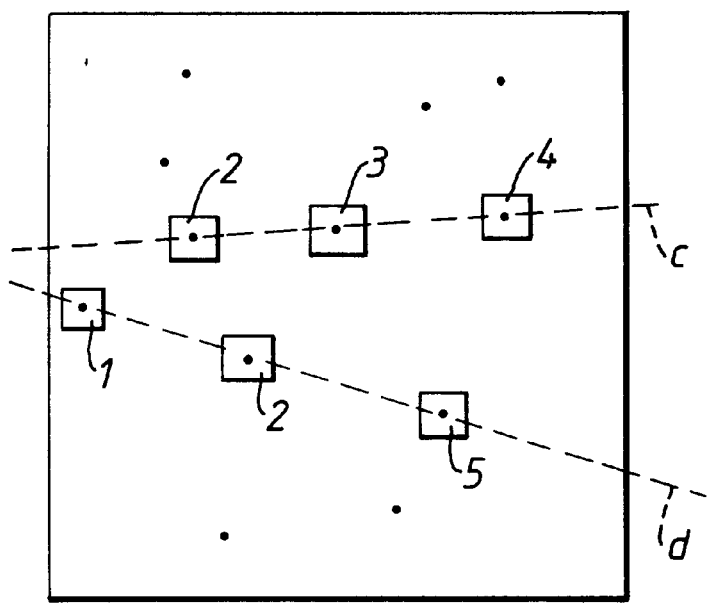

Ideally, one track will be found which passes, in the correct sequence, through an occupied peak box for each correlation surface, as illustrated in FIG. 7. However, in practice, it is unlikely that such a perfect match will be found. It is then necessary to apply various selection criteria to determine which is the most likely "true" line. The first criterion to be applied is that regarding the number of boxes which are occupied. Where there are two or more possible lines, the line which passes through the largest number of occupied boxes is that selected. Thus, in the illustration of FIG. 8, line b is chosen. It may be that no unambiguous line is found because two or more lines pass through the same number of occupied boxes. It is then necessary to apply further selection rules, the order in which they are applied being chosen according to the particular application of the apparatus. One criterion which may be used is that of numbering the peaks of each correlation surface according to their size, so that the largest peak is peak number 1, the second largest is peak number 2, and so on. The allocated peak numbers for each of the peaks contained within a box through which a line passes are then summed for each of the lines which have been found, and that line having the lowest sum is chosen to be the "true" line. This is illustrated in FIG. 9, where line c is defined by correlation maxima from correlation surfaces 2,3 and 4, and line d by maxima from correlation surfaces 1,2 and 5. In this example, for line c, the peak from surface 2 is the largest of a plurality of peaks of that surface and is peak number 1. The peak of surface 3 is the fourth largest, and given peak number 4, and that of surface 4 is the fifth largest and therefore allocated peak number 5. For line d, the peaks from surfaces 1, 2 and 5 are allocated peak numbers 2,2, and 1. The sum of the peak numbers of line c is 10, and that for line d is 5. Thus, line d is selected as the "true" line. Another rule which may be applied where different size boxes are used is to sum the areas of the boxes occupied for each line and choosing that line which has the smallest box area sum. It may be that two tracks are found which have a common peak. For example, one track might pass through boxes occupied by peaks from correlation surfaces relating to scenes 1, 2 and 4, and the other track might pass through occupied boxes corresponding to scenes 4, 6 and 7. It is then possible to join the two lines to produce a single "true" line.

The resultant "true" flight path is compared at 15 (FIG. 2) with that indicated by the main navigation system over the time period of the scene capture to obtain an error signal. This enables co-ordinate corrections (for example, in latitude and longitude) to be derived, which can then be used to update the navigation system, enhancing its accuracy.

A central processing unit 16 is employed to provide control signals to the circuitry and to apply the corrections obtained to the navigation system.

The scene processing and reference/scene correlation would normally be performed in dedicated hardware. The peak templating could also be performed in hardware (as opposed to software) by storing all the peak co-ordinates (with respect to the correlation surface domain) in random access memory and using logic circuitry to perform the template analysis. The method of using a plurality of scenes to provide matching with a reference area may be used in combination with, for example, a Small Reference/Large Scene technique, the former method being used in the initial stages of obtaining a position fix, and the latter technique being implemented once the position has been established, to provide up-dating.

We claim:

1. Navigation apparatus for a moving body comprising: means arranged to obtain a plurality of area scenes by viewing the surroundings of the body as it moves; means arranged to compare said plurality of scenes with a reference area which is large relative to each of said plurality of scenes; and means for finding the overall position of best match between said plurality of said area scenes taken together and said large reference area.

2. Apparatus as claimed in claim 1 wherein said means for comparing includes means for correlating each of said area scenes with said large reference area to produce a correlation surface domain comprising a distribution of correlation maxima for each of said area scenes.

3. Apparatus as claimed in claim 2 wherein each correlation maximum is considered to extend to a box which surrounds it, and means are included for finding the best line through the boxes.

4. Apparatus as claimed in claim 3 wherein said boxes are of equal area.

5. Apparatus as claimed in claim 3 wherein boxes associated with maxima resulting from comparison with first captured area scenes are smaller than those associated with later captured said scenes.

6. Apparatus as claimed in claim 1 wherein means are included for obtaining from a navigation system, which uses information regarding the movement of the flying body, an estimation of the relative positions of successively captured said area scenes.

7. Apparatus as claimed in claim 3 wherein the best line to give the best match is taken to be that which is defined by the most maxima, each maximum being related to a respective correlation surface and the maxima being in an appropriate sequence, having regard to the order in which the area scenes are captured.

8. Apparatus as claimed in claim 7 and wherein, where boxes of different sizes are employed, means are included for choosing as the best line that which is defined by maxima having the smallest box area sum.

9. Apparatus as claimed in claim 3 and, where more than one line giving the best match is found which are defined by the same number of maxima, and means are included for selecting as the "true" line that in which the degree of matching indicated by the maxima taken together is largest.

10. Apparatus as claimed in claim 9 and wherein, where boxes of different sizes are employed, means are included for choosing as the best line that which is defined by maxima having the smallest box area sum.

11. Apparatus as claimed in claim 1 and including means arranged to join two lines each defining a position of best match and having a common correlation maxima to produce a single "true" line.

12. Apparatus as claimed in claim 1 wherein means are included for using the overall position of best match to produce an error signal to correct a navigation system associated with the flying body.

13. Apparatus as defined in claim 3 wherein means are included for obtaining from a navigation system, which uses information regarding the movement of the flying body, an estimation of the relative positions of successively captured said area scenes.

14. Apparatus as defined in claim 3 and including means arranged to join two lines each defining a position of best match and having a common correlation maxima to produce a single "true" line.

15. Apparatus as defined in claim 3 wherein means are included for using the overall position of best match to produce an error signal to correct a navigation system associated with the flying body.

16. In a navigation apparatus for a moving body including means for obtaining a plurality of scenes corresponding to ground features by viewing the ground as the body moves; and means for correlating said scenes with a known pre-stored reference area which is large relative to the area of each of said plurality of scenes; the improvement wherein: said means for correlating includes means for correlating each of said scenes with the same said reference area to produce a composite correlation surface domain comprising a distribution of correlation maxima from all of said scenes; and means for determining the overall position of best match between said plurality of scenes and said reference area from said distribution of correlation maxima.

* * * * *